CARL DIETRICH JULIUS SEITZ, OF BURY, ENGLAND, ASSIGNOR TO HIMSELF AND CHARLES EDMUND BAILLIÈRE, OF NEW YORK CITY.

*Letters Patent No. 83,733, dated November 3, 1868.*

IMPROVEMENT IN RECOVERING WASTE ALKALIES FROM PAPER-STOCK AND OTHER FIBRES.

The Schedule referred to in these Letters Patent and making part of the same.

*To all to whom it may concern:*

Be it known that I, CARL DIETRICH JULIUS SEITZ, of Bury, Lancashire, England, have invented or discovered certain new and useful Improvements in Treating the Waste Liquors resulting from the preparation of bamboo, cane, Esparto grass, alfa, straw, and other similar fibrous substances, and in recovering the alkali therefrom, in a state fit for boiling fresh portions of fibrous substances; and I do hereby declare that the following is a full, true, and exact description thereof; that is to say—

The waste liquors obtained from the boiling-process in the preparation of bamboo, cane, Esparto grass, alfa, straw, and other similar fibrous substances, and the liquors obtained by submitting the boiled fibrous substances to pressure, are run or pumped, either direct into evaporating-pans or furnaces, or into reservoirs, and thence into the evaporating-pans or furnaces. The liquors are here evaporated down to from one-half to one-fourth of their bulk. I now add to the boiling liquors a certain proportion, say fifteen to twenty per cent., of real soda, (in the form of caustic soda, soda-ash, any kind of recovered ash, or the corresponding quantity of sulphate of soda,) and run this now very strong solution, boiling hot, over quicklime, (either hot or cold,) in such a manner that the lime absorbs the greatest possible amount of the liquid; or I add the soda, (caustic soda, soda-ash, recovered ash, or the corresponding quantity of sulphate of soda,) in the dry state to the lime, (either hot or cold,) and run the liquors, boiling hot, over this mixture of quicklime and soda. By this process of slaking the lime, the remaining portion of water in the liquors is disposed of without any expense of fuel.

This mixture, consisting principally of soda-salts, hydrate of lime, and carbonaceous matter, when dry or nearly dry, I furnace, either in a reverberatory furnace, revolving furnace, or in a so-called blind furnace, or I burn it in an ordinary conical lime-kiln. In any case I utilize the heat given off by the burning of the carbonaceous matter in the mixture for evaporating the original waste liquors.

By means of my invention, the total destruction of the carbonaceous matter and other impurities is facilitated, the silica contained in the waste liquors is removed, the sulphate of soda is wholly or partly converted into caustic or carbonate of soda, and the soda recovered from the waste lyes is at once obtained in a state fit for boiling fresh portions of fibrous substances.

What I claim as my invention, and desire to secure by Letter Patent, is—

1. The general system or mode of treating the waste liquors resulting from the preparation of bamboo, cane, Esparto grass, alfa, straw, or other similar fibrous substances, as and for the purposes herein set forth.

2. The system or mode of mixing the concentrated waste liquors with a certain proportion of soda, (caustic soda, soda-ash, recovered ash, or sulphate of soda,) and with quicklime, in the manner herein set forth.

In witness whereof, I, the said CARL DIETRICH JULIUS SEITZ, have hereunto set my hand, this 28th day of November, 1867.

C. D. J. SEITZ.

Witnesses:
  RICHARD PAGE,
    *Solicitor, 2 Booth Street, Manchester.*
  LEONARD METCALFE,
    *Clerk with Rowley & Page, Solicitors,*
     *2 Booth Street, Manchester.*